Patented Mar. 25, 1941

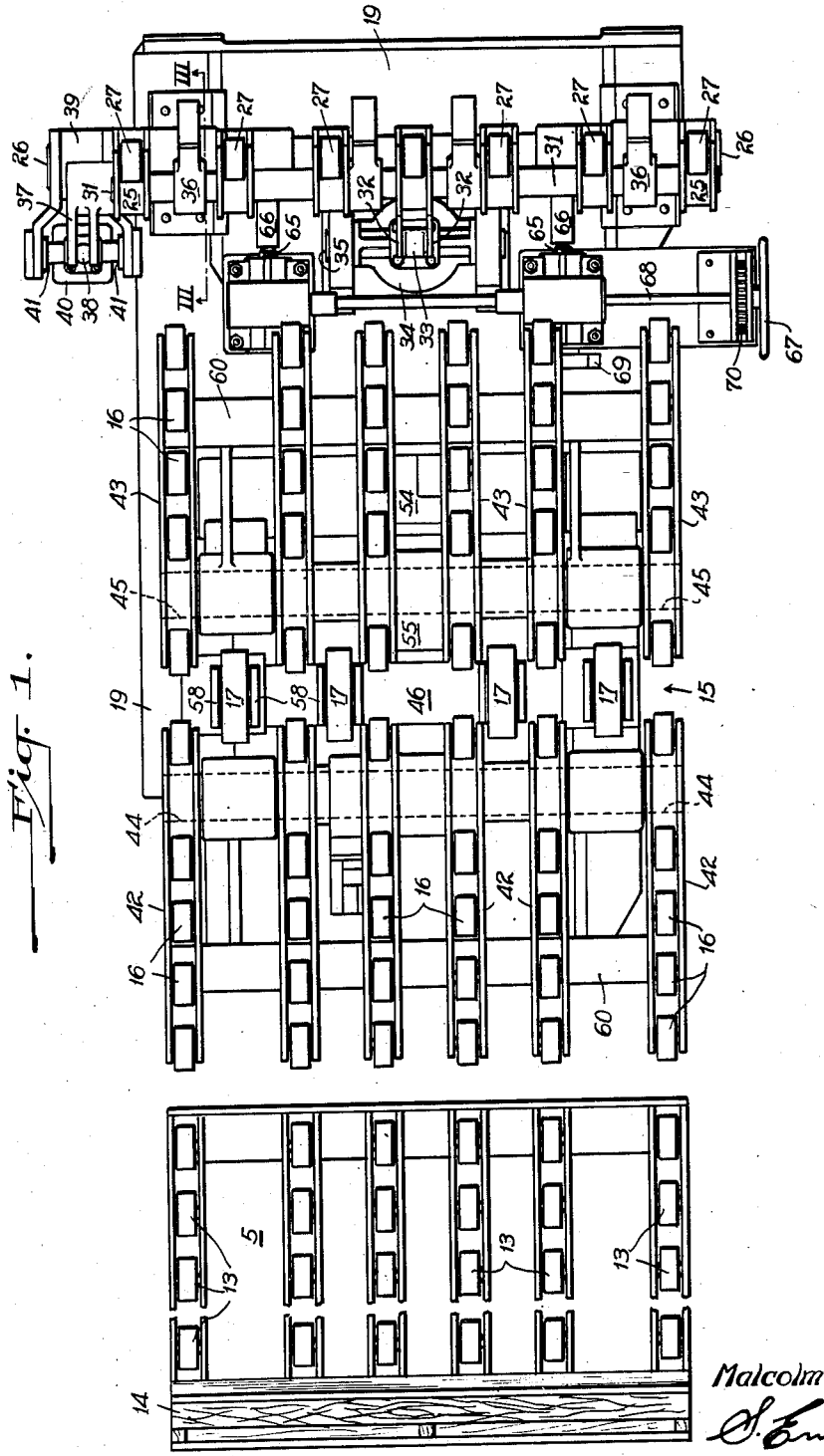

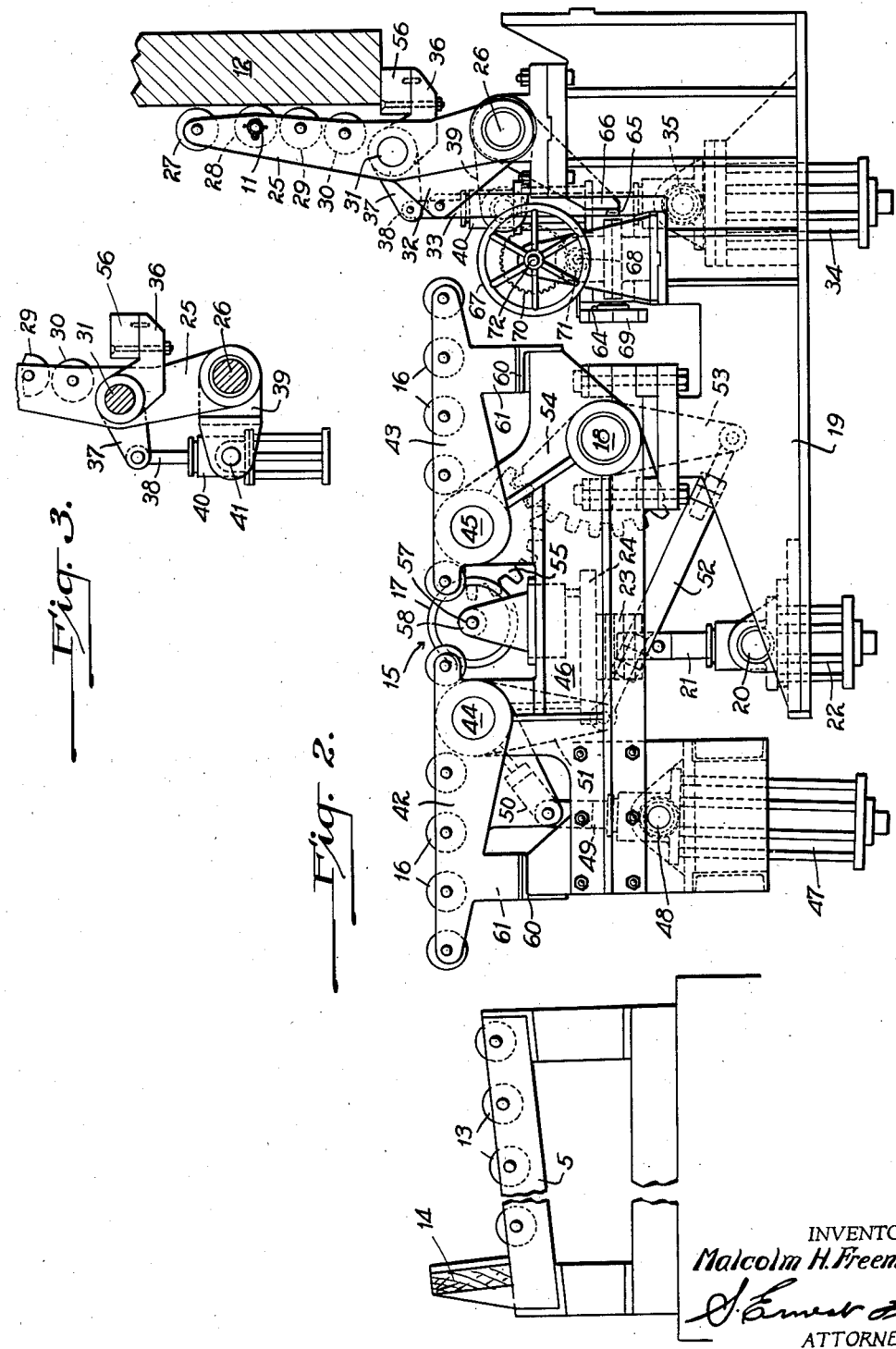

2,235,832

UNITED STATES PATENT OFFICE 2,235,832

WORK MANIPULATOR

Malcolm H. Freeman, Maryville, Tenn., assignor to Aluminum Company of America, Pittsburgh, Pa., a corporation of Pennsylvania Application January 30, 1940, Serial No. 316,348

16 Claims. (Cl. 90—59)

The present invention relates to a work manipulator and more particularly to work handling apparatus for conveying, inverting, turning, and handling work pieces such as ingots, billets, slabs, plates, and the like. The invention is particularly adapted for manipulating such work pieces to and from a surface material working machine, particularly a "scalping" machine.

The work handling apparatus herein described as the preferred embodiment of the invention is especially designed for use with a machine such as is disclosed in the pending application of Fred H. Fanning for improvements in "Surface material working," United States Serial No. 293,269, filed September 2, 1939.

The requirements in the practice of surface working or scalping ingots, billets, slabs, plates, and the like will be found more fully set forth in the application above referred to. It is here noted that in the preferred scalping practice, an ingot (using the word generally to describe the various work pieces above mentioned) is brought to a scalping machine upon a conveyor in horizontal position, or by a crane or other transporting means from which it is deposited in a horizontal position, from which position it is desirable to turn the ingot into a raised position for the surface material working or scalping operation, it being desirable to perform this latter operation with the ingot in vertical or inclined position in order that material removed from the ingot may readily fall away from the work and the cutters. Thus, one of the desired services of a work manipulating or work handling apparatus for use in connection with a surface material working or scalping machine is that of turning an ingot from a horizontal to a raised position. A like desired service is that of turning the ingot from a raised position to a horizontal position.

It is also noted here that in such practice the ingot is to be scalped on two or more opposite sides. While in some cases it is possible to perform the surface working operation simultaneously on a plurality of sides of the ingot, generally it is necessary to place the ingot in the machine, work one side, remove the ingot, invert it or turn it over, replace it in the machine, and work a second side. It is then another desired service of a work manipulating or work handling apparatus that it be constructed to invert the ingot for this purpose.

A further service which it is desirable that the manipulating or handling apparatus perform is that of conveying the ingot to and from the points of supply and delivery.

One object of the present invention is the elimination of lost time in the operation of a surface material working machine, especially as respects the period during which the work pieces are conveyed, inverted, and turned or handled to and from the machine.

Another object of the invention is the provision of improved manipulating or handling apparatus for receiving, loading and unloading, inverting, and discharging ingots for use with a surface material working machine.

A further object is the provision of a conveyor table adapted to be inclined in either direction for delivery of an ingot therealong, which conveyor table may likewise serve as an inverting means for inverting the ingot. Another object is the provision with such table of apparatus for handling an ingot to and from raised position with respect thereto.

Another object is the provision of an inclinable conveyor table adapted to be interleaved with rotatable work turning arms for turning and handling work to and from the roller table.

Another object of the invention is the provision of a combined conveyor, inverter, and turner for manipulating or handling work pieces.

Other objects and advantages of the present invention which may be obtained thereby, either singly or in combination, will become apparent upon the reading of the accompanying description, in conjunction with the drawings, which discloses the preferred form of the invention and suggests certain modifications thereof. Likewise, the above defined specific objects are to be considered as intended to explain the general purposes of the invention either singly or in combination, and the invention should not be considered as limited to use with surface material working machines.

In the drawings:

Fig. 1 is a plan view of a preferred form of work handling apparatus conforming to the present invention and including an unloading table, a conveying-inverting table, and turning arms;

Fig. 2 is a side elevation of the apparatus shown in Fig. 1 with an ingot shown supported by the turning arms in raised position; and Fig. 3 is a section taken along the line III—III of Fig. 1 showing in detail a portion of the turning arms, supporting fingers, and apparatus associated therewith.

Referring to the drawings, the work handling apparatus includes an unloading table 5 adapted to receive finished ingots 12 after they have been worked on and removed from a scalping machine such as is disclosed in the aforementioned pending application. The unloading table 5 is supported on a suitable foundation and has a roller surface composed of rollers 13 freely mounted therein, the surface being inclined downwardly away from the remaining portion of the apparatus. An abutment 14 is provided at the lower end of inclined unloading table 5 against which an ingot 12 may come to rest as it is supported on rollers 13.

The work handling apparatus also includes the roller conveying table 15, the upper surface of which is normally comprised of a plurality of rollers 16 and 17. Rollers 16 are supported in pivoted work inverting arms 42 and 43, normally horizontally disposed and supported in laterally spaced relation on a pivotally mounted frame 46; and rollers 17 are suitably mounted on shafts 57 supported in bearings 58 on said pivoted frame 46. The composite roller table 15 with frame 46 is hingedly mounted at one end on shaft 18 located in suitable bearings in a fixed base 19, and is movably supported at approximately its center by means of a connecting linkage associated with a pressure cylinder 22. The above described mounting of roller table 15 is such that its normally plane upper surface may be slightly inclined or tilted either toward or away from the work turning arms 25 next to be referred to or, at the same time, away from or toward the unloading table 5 above described, through the operation of the pressure cylinder 22, whereby to cause an ingot resting on the table 15 to move by gravity therealong.

Also associated with and forming part of the manipulating or work handling apparatus as presently described are a plurality of spaced parallel work turning arms 25, normally interleaved longitudinally between inverting arms 43 in horizontal position, but shown in the drawings in raised position. These arms 25 are pivoted to fixed base 19 adjacent one end of the table 15 on a shaft 26 to which they are secured, and carry a plurality of freely mounted work engaging rollers 27, 28, 29, and 30, presenting an outwardly convex, work engaging surface. The work engaging rollers 28, it will be noted, project laterally beyond the longitudinal axes of the loading arms 25 a slight distance greater than the rollers 27, 29, and 30 for a purpose which will be hereinafter described. Likewise, the rollers 28 are adjustably mounted, for varying this relative amount of projection, on pins each having an adjustable wing nut 11 at one end thereof, the pins being located in elongated slots in turning arms 25, as shown particularly in Fig. 2.

The turning arms 25 are adapted to be moved from a substantially horizontal position below the surface of roller table 15 (their normal position) to an inclined or substantially vertical, raised position, as in Fig. 2, and to be returned, through the operation of a connecting linkage associated with a pressure cylinder 34.

When an ingot 12 resting horizontally on roller table 15 is to be turned into a raised position (where it may be placed in a holder of a surface working machine such as is described in the above mentioned copending application), the turning arms 25 occupy the horizontal position, with the rollers 27, 28, 29, and 30 forming a convex surface substantially in alignment with the interleaved surface formed by rollers 16 carried by arms 43.

The ingot 12 asumes a position over turning arms 25 by gravity movement over the previously or then tilted roller table 15, its movement in the direction of the turning arms 25 being arrested by a plurality of work supporting fingers 36 mounted on turning arms 25, the fingers then being held in a position substantially at right angles to the longitudinal axes of arms 25 by means of a connecting linkage and pressure cylinder 40 (shown to best advantage in Fig. 3) associated therewith.

It is pointed out that fingers 36 may be retracted from their normal position perpendicular to arms 25 to lie more nearly in alignment with the longitudinal axes of arms 25 by the outward movement of the piston rod 38 from the pressure cylinder 40. But for arresting the movement of the ingot 12 as above described and for supporting the ingot 12, the fingers 36 will be mounted in the position relative to arms 25 as is shown in the upright position of arms 25 in Figs. 2 and 3. Thus an ingot 12, resting on a portion of roller table 15 and abutting against fingers 36, may be lifted by arms 25, turned into inclined or substantially vertical position, and then deposited in an apparatus adapted to receive the ingot in that position after retraction of the fingers 36, as will be hereinafter described.

The fingers 36 are mounted on a through shaft 31 common to all arms 25. In the upright position of arms 25, the extended fingers 36 preferably support an ingot 12 slightly above the position at which the ingot 12 will be deposited, as in a surface working machine. For adjusting this position, various sizes of blocks or inserts 56 may be secured to the fingers 36 as by bolts, shown in Figs. 2 and 3. After the ingot has been deposited, as in a surface working machine, the fingers 36 may be retracted with respect to arms 25 by means of pressure cylinder 40 and its connecting linkage so that ingot 12 is lowered into the surface working or like machine, and the arms 25 may then be returned to horizontal position without interference by the positioned ingot 12 with the fingers 36, i. e., so that fingers 36 will clear the outermost lower edge of the ingot 12. The supporting surfaces of the inserts 56 on fingers 36 are preferably smooth so as to facilitate easy sliding of the ingot 12 thereon during the transfer of the ingot 12 to the surface working or like machine.

The turning arms 25 usually must be returned to the horizontal position to permit further operation of the surface working or like machine, whereupon the arms 25 may again be brought to the upright position and the fingers 36 actuated into supporting position for removal of the ingot 12. Upon receipt of the ingot 12 upon the supporting inserts 56 of fingers 36, the arms 25 may be returned again to their horizontal position to carry the ingot back to a horizontal position on table 15. After an ingot 12 has been returned to a roller table 15, as above described, it must then be inverted so that the unfinished surface thereof may be exposed after it is reloaded by the turning arms 25 into the surface working or like machine.

For inverting the ingots 12, the aforementioned roller table 15 is constructed with pivoted inverting arms 42 and 43 in which the rollers 16 are mounted, and the centrally located series of rollers 17 over which the edge or end of the ingot 12 may rock as it is inverted by the motion of the arms 42 and 43 to and from substantially parallel, cooperative, off-vertical positions.

The inverting arms 42 and 43 are secured to shafts 44 and 45, respectively, mounted in bearings secured to the pivoted frame portion 46 of the roller table 15, previously described as pivoted on shaft 18 supported in bearings secured to fixed base 19 of the apparatus. Means for causing rotation of arms 42 from the horizontal to a position less than vertical, and for simultaneously causing rotation of arms 43 from horizontal to a position slightly beyond vertical (wherein the arms 42 and 43 may be said to be in cooperative, off-vertical position) is provided in the form of a pressure cylinder 47, mounted on trunnions 48 in suitable bearings secured in pivoted frame 46 of the apparatus, and the connecting linkage therefor. A piston rod 49 from the pressure cylinder 47 connects to a lever 50 extending from and secured to the shaft 44 to which the inverting arms 42 are also secured, this linkage being adapted to impart a rotary motion to shaft 44. A rotary motion opposite in direction to that applied to shaft 44 by pressure cylinder 47, through the aforementioned linkage, is at the same time imparted to shaft 45, through the medium of a crank 51 secured to shaft 44, an adjustable link 52 connected at one end to the crank 51, a crank 53 rotatable about shaft 18, to which the opposite end of link 52 is secured, a gear segment 54 fixed for angular movement with lever 53, and a meshing gear segment 55 mounted on and secured to shaft 45.

As will be noted from the drawings, the gear ratio between segments 54 and 55 is such that segment 55, and thereby shaft 45, has a greater increment of angular movement for each increment of angular movement of shaft 44, the cranks 51 and 53 being preferably of the same length. Thus the arms 43 on shaft 45 will be rotated through a greater angle than will arms 42 on shaft 44, both being actuated by the common operating means comprised of pressure cylinder 47 and the connecting linkages associated therewith.

The arrangement of arms 42 and 43, and the actuating mechanism therefor, is provided so that an ingot located in substantially horizontal position over the arms 43 may be turned up, beyond over-center, by arms 43 and allowed to return to horizontal position with arms 42 and thus be inverted as arms 42 and 43 are folded up and unfolded, whereupon the ingot may be caused to approach the supporting fingers 36 on turning arms 25 and again be lifted and turned by arms 25 into inclined or vertical position with the outer face thereof reversed. As aforementioned, the rollers 17 serve as an abutment over which the ingot 12 to be inverted may be rocked. They are preferably freely mounted in pairs of bearing members 58 secured to pivoted frame 46. The lower position of inverting arms 42 and 43 with reference to frame 46 is preferably predetermined by means of abutments 60 on frame 46 adapted to support the outer ends of arms 42 and 43 when in substantially horizontal position (Fig. 2) through the projections 61 thereon.

As aforementioned, the entire roller table 15, including its frame 46, is movable for slight inclination in either direction about shaft 18, through the medium of pressure cylinder 22. This cylinder 22 is mounted on trunnions 20 located in suitable bearing members in the fixed base 19. A piston rod 21 actuated by pressure cylinder 22 is operable to cause the movement of roller table 15 and frame 46 through the medium of a suitable universal coupling 23 and cushion 24, preferably of rubber or the like for absorbing shocks. Thus the elevation of the center of table 15 is established by the position of the piston in the cylinder 22. It is then preferable that the piston be approximately at the center of its travel when table 15 is horizontal.

The turning arms 25 are mounted for motion from horizontal to inclined or upright position preferably by being secured to a shaft 26 to which motive forces are applied by means of pressure cylinder 34 which is mounted on trunnions 35 in suitable bearing members secured to fixed base 19. The piston of the pressure cylinder 34 acts on piston rod 33 engaging a bracket 32 on the center arm 25 (see Fig. 1) and is adapted to cause movement of all of the turning arms 25 through the center arm 25 carrying bracket 32 and the shaft 26 to which all of the arms 25 are secured.

For actuating the aforementioned fingers 36 there is provided a pressure cylinder 40 (see in particular Fig. 3) mounted on trunnions 41 bearing in a bracket 39 secured to the shaft 26. The pressure cylinder 40 actuates the various fingers 36 through the medium of piston rod 38, crank 37, and through shaft 31 to which crank 37 is secured. Thus the fingers 36 are moved with through shaft 31 to which they are secured, the shaft 31 being journaled in arms 25.

The limiting position of turning arms 25 when moved so that their longitudinal axes are inclined or substantially vertical, is preferably controlled by means of two adjustable stop pins 65 adapted to abut against dogs 66 keyed to shaft 26 as shown in Figs. 1 and 2. The stop pins 65 are preferably commonly actuated for adjustable, predetermined position by means of a hand wheel 67, on a stub shaft 72, adapted to turn a gear 70, also on shaft 72, the gear 70 engaging a pinion 71 on a through shaft 68. The through shaft 68 carries worms adjacent and above each stop pin 65 adapted to turn worm gears carrying suitable nuts 64 therewithin adapted to drive the screw-threaded stop pins 65 in unison to predetermined positions. A dial 69 is provided on the end of one of the nuts 64 opposite the corresponding stop pin 65 for indicating the setting of that stop pin 65; the dial 69 may be calibrated for predetermined positions of the stop pins 65. The two sets of stop pins 65 and dogs 66 are preferably provided for operation at spaced positions along shaft 26 for accuracy in locating the upper position of tilted arms 25 and to minimize the variation in location of arms 25, possible through torsional strain of shaft 26; the arms 25 form a locating surface adapted to predetermine the position of the ingot 12 with reference to the surface working or like machine.

Operation

The preferred cycle of operation with which the presently described embodiment of the invention is employed is as follows:

An ingot 12 may be brought to the table 15 in horizontal position by means of a suitable conveyor extending laterally from the table 15, or if desired, the unloading table 5 may be disposed of and a conveyor may be located in line with table 15 and interleaved therewith if desired, or the ingot 12 may be deposited on roller table 15 by suitable crane and tongs, or by other means. Assuming than an ingot is at rest on the rollers 16 on the inverting arms 42, it may be caused to roll or slide over the rollers 16 and 17 to a position over the inverting arms 43 by then or previously moving the table 15 into a position downwardly inclined toward turning arms 25 by actuation of the pressure cylinder 22, acting on the frame 46 through its linkage. With the table 15 so inclined, the ingot will move over the turning arms 25 against the supporting fingers 36 thereon, the arms 25 then being in substantially horizontal position and the fingers 36 then being in substantially perpendicular position. The turning arms 25 will then be rotated through a desired angle to carry the ingot 12 from a substantially horizontal position to an inclined or vertical position where it will be supported by the fingers 36.

The upward position of the turning arms 25 will have been predetermined by a setting of the stop pins 65 through adjustment of the hand wheel 67 (or in some cases by the relative location of a work holder in the surface working or like machine), and therefore the outermost set of projecting rollers 28, which are adjustable with reference to the loading arms 25, will predetermine the outward position of ingot 12 for its location in a surface working or like machine. When the ingot 12 has been deposited, the fingers 36 will be retracted downwardly about shaft 31 by means of the pressure cylinder 40 and the linkage associated therewith. After the ingot 12 has been suitably secured, the turning arms 25 may be withdrawn from the face of ingot 12 and returned to substantially horizontal position interleaved with the arms 43 of the table 15.

Thereafter the ingot may be operated upon in the surface working or like machine and returned to be received again by the supporting fingers 36 and turning arms 25. The ingot 12 may be withdrawn by raising the turning arms 25 to their inclined or vertical position, whereupon the supporting fingers 36 may be raised to lift and carry the ingot 12, then or previously released from the surface working or like machine. The arms 25 may then be returned to substantially horizontal position for turning and handling the ingot 12 back to rest on the rollers 16 on the inverting arms 43. At this time the ingot 12 is ready to be inverted so that it may again be placed in the surface working or like machine for operation on its second surface.

For inverting the ingot 12, the inverting arms 42 and 43 are raised to cooperative, off-vertical position and then returned to substantially horizontal position, the ingot 12 following the arms 43 upwardly and the arms 42 downwardly.

At this point the cycle of operation above described may be reinstituted, and after return of the ingot 12 to the table 15 after the second working operation in the surface working or like machine, the ingot 12 may be removed from the roller table 15 by tilting the same toward the unloading table 5. Thereupon the ingot 12 will roll or slide along the rollers 16 onto the rollers 13 of the unloading table 5 and will come to rest against the abutment 14 of the unloading table 5. From the unloading table 5 the ingot may be removed by suitable conveyors, crane and tongs, or by other means. Such means may of course be employed to directly remove the ingot from table 15, thus eliminating the use of unloading table 5.

It is to be noted that this cycle of operation permits of delivering, loading, unloading, and inverting an ingot by one combined and integral apparatus affording great convenience and efficiency in handling.

While the invention has been described with reference to a manipulator or work handling apparatus for use in conjunction with a surface working or like machine, particularly for use in conjunction with a machine such as is described in the above mentioned copending application, nevertheless it is to be understood that the invention will have many applications to other apparatus wherein work pieces are to be handled or manipulated in like fashion.

The appended claims are intended to be expressive of the novel features and arrangement of parts forming the present invention, it being understood that various modifications may be made in the preferred embodiment thereof, here shown and described, without departing from its nature or scope.

What is claimed is:

1. A work handling apparatus comprising a conveyor table normally disposed in a horizontal plane, means for moving said table into inclined position for gravity delivery therealong of a work piece, rotatably mounted work inverting arms normally forming portions of said table, means for rotating said inverting arms to and from cooperative, off-vertical position for inverting a work piece, a plurality of work turning arms mounted for rotation about an axis substantially parallel to the axes of rotation of said inverting arms and adjacent an end of said table, said turning arms being normally disposed in substantially horizontal position beneath said table, and means for rotating said turning arms to and from raised position for simultaneously turning a work piece and handling it to and from said table.

2. A work handling apparatus comprising a conveyor table normally disposed in a horizontal plane, means for moving said table into inclined position for gravity delivery therealong of a work piece, a plurality of opposed pairs of rotatably mounted work inverting arms normally forming portions of said table, means for rotating said inverting arms to and from cooperative, off-vertical position for inverting a work piece, at least one work turning arm mounted for rotation about an axis substantially parallel to the axes of rotation of said inverting arms and adjacent an end of said table, said turning arm being normally disposed in substantially horizontal position beneath said table, and means for rotating said turning arm to and from raised position for simultaneously turning a work piece and handling it to and from said table.

3. A work handling apparatus comprising a conveyor table normally disposed in a horizontal plane and presenting an unobstructed conveyor surface throughout its length, means for moving said table into positions inclined in either direction for gravity therealong of a work piece, a plurality of rotatably mounted work inverting arms normally forming portions of said table, means for simultaneously rotating said inverting arms to and from cooperative, off-vertical position for inverting a work piece, a plurality of work turning arms mounted for rotation about an axis adjacent and end of said table, said turning arms being normally disposed in substantially horizontal position beneath said table and interleaved with said inverting arms, and means for simultaneously rotating said turning arms to and from raised position for both turning a work piece and handling it to and from said table.

4. A work handling apparatus comprising a conveyor table normally disposed in a horizontal plane, means for moving said table into inclined position for gravity delivery therealong of a work piece, rotatably mounted work inverting arms normally forming portions of said table, means for rotating said inverting arms to and from cooperative, off-vertical position for inverting a work piece, a plurality of work turning arms mounted for rotation about an axis substantially parallel to the axes of rotation of said inverting arms and adjacent an end of said table, said turning arms being normally disposed in substantially horizontal position beneath said table and presenting an upwardly exposed work engaging surface of at least slightly convex configuration, and means for rotating said turning arms to and from raised position for simultaneously turning a work piece and handling it to and from said table.

5. A work handling apparatus comprising a conveyor table normally disposed in a horizontal plane, means for moving said table into inclined position for gravity delivery therealong of a work piece, rotatably mounted work inverting arms normally forming portions of said table, means for rotating said inverting arms to and from cooperative, off-vertical position for inverting a work piece, a plurality of work turning arms mounted for rotation about an axis substantially parallel to the axes of rotation of said inverting arms and adjacent an end of said table, said turning arms being normally disposed in substantially horizontal position beneath said table and presenting an upwardly exposed work engaging surface of at least slightly convex configuration, means for rotating said turning arms to and from raised position for simultaneously turning a work piece and handling it to and from said table, and an adjustable stop for limiting the upward rotation of said turning arms.

6. A work handling apparatus comprising a conveyor table normally disposed in a horizontal plane, means for moving said table into inclined position for gravity delivery therealong of a work piece, rotatably mounted work inverting arms normally forming portions of said table, means for rotating said inverting arms to and from cooperative, off-vertical position for inverting a work piece, a plurality of work turning arms mounted for rotation about an axis substantially parallel to the axes of rotation of said inverting arms and adjacent an end of said table, said turning arms being normally disposed in substantially horizontal position beneath said table, means for rotating said turning arms to and from raised position for simultaneously turning a work piece and handling it to and from said table, work supporting fingers carried by said turning arms and rotatably mounted relative thereto adjacent the axis of rotation of said turning arms, said supporting fingers being normally disposed in work supporting position substantially perpendicular to said turning arms and extending from their work engaging surfaces, and means for rotating said supporting fingers into and out of work supporting position.

7. A work handling apparatus comprising a conveyor table normally disposed in a horizontal plane and presenting an unobstructed conveyor surface throughout its length, means for moving said table into positions inclined in either direction for gravity delivery therealong of a work piece, a plurality of rotatably mounted work inverting arms normally forming portions of said table, means for simultaneously rotating said inverting arms to and from cooperative, off-vertical position for inverting a work piece, a plurality of work turning arms mounted for rotation about an axis adjacent an end of said table, said turning arms being normally disposed in substantially horizontal position beneath said table and interleaved with said inverting arms, means for simultaneously rotating said turning arms to and from raised position for both turning a work piece and handling it to and from said table, work supporting fingers carried by said turning arms and rotatably mounted relative thereto adjacent the axis of rotation of said turning arms, said supporting fingers being normally disposed in work supporting position substantially perpendicular to said turning arms and extending from their work engaging surfaces, means for rotating said fingers into and out of work supporting position, and an adjustable stop for limiting the upward rotation of said turning arms.

8. A work handling apparatus comprising an inclinable roller table normally disposed in a horizontal plane, means for moving said table into positions inclined in either longitudinal direction for gravity delivery therealong of a work piece, rotatably mounted work inverting arms carrying rollers and normally forming portions of said table, means for rotating said inverting arms to and from cooperative, off-vertical position for inverting a work piece, a plurality of work turning arms carrying rollers and mounted for rotation about an axis substantially parallel to the axes of rotation of said inverting arms and adjacent an end of said table, said turning arms being normally disposed in substantially horizontal position beneath said table, and means for rotating said turning arms to and from raised position for both turning a work piece and handling it to and from said table.

9. A work handling apparatus comprising an inclinable roller table normally disposed in a horizontal plane, means for moving said table about an axis to incline the same in either longitudinal direction for gravity delivery therealong of a work piece, a plurality of work inverting arms carrying rollers and extending in either direction longitudinally from a pair of axes about which said inverting arms are rotatably mounted, and said inverting arms normally forming portions of said table, common means for rotating said inverting arms about said pair of axes to and from cooperative, off-vertical position for inverting a work piece, a plurality of work turning arms carrying rollers and mounted for rotation about an axis substantially parallel to said axes of rotation of said inverting arms and adjacent an end of said table, said turning arms being normally disposed in substantially horizontal position beneath said table, and common means for rotating said turning arms to and from raised position for both turning a work piece and handling it to and from said table.

10. A work handling apparatus comprising an inclinable roller table normally disposed in a horizontal plane, means for moving said table into positions inclined in either longitudinal direction for gravity delivery therealong of a work piece, rotatably mounted work inverting arms carrying rollers and normally forming portions of said table, means for rotating said inverting arms to and from cooperative, off-vertical position for inverting a work piece, a plurality of work turning arms carrying rollers and mounted for rotation about an axis substantially parallel to the axes of rotation of said inverting arms and adjacent an end of said table, said turning arms being normally disposed in substantially horizontal position beneath said table and presenting an upwardly exposed multiple roller surface of at least slightly convex configuration, and means for rotating said turning arms to and from raised position for both turning a work piece and handling it to and from said table.

11. A work handling apparatus comprising an inclinable roller table normally disposed in a horizontal plane, means for moving said table into positions inclined in either longitudinal direction for gravity delivery therealong of a work piece, rotatably mounted work inverting arms carrying rollers and normally forming portions of said table, means for rotating said inverting arms to and from cooperative, off-vertical position for inverting a work piece, a plurality of work turning arms carrying rollers and mounted for rotation about an axis substantially parallel to the axes of rotation of said inverting arms and adjacent an end of said table, said turning arms being normally disposed in substantially horizontal position beneath said table and presenting an upwardly exposed multiple roller surface of at least slightly convex configuration, means for rotating said turning arms to and from raised position for both turning a work piece and handling it to and from said table, and an adjustable stop for limiting the upward rotation of said turning arms.

12. A work handling apparatus comprising an inclinable roller table normally disposed in a horizontal plane, means for moving said table into positions inclined in either longitudinal direction for gravity delivery therealong of a work piece, rotatably mounted work inverting arms carrying rollers and normally forming portions of said table, means for rotating said inverting arms to and from cooperative, off-vertical position for inverting a work piece, a plurality of work turning arms carrying rollers and mounted for rotation about an axis substantially parallel to the axes of rotation of said inverting arms and adjacent an end of said table, said turning arms being normally disposed in substantially horizontal position beneath said table and presenting an upwardly exposed multiple roller surface of at least slightly convex configuration, a roller intermediate the ends of each of said turning arms being adjustably mounted for movement laterally of said turning arm, and means for rotating said turning arms to and from raised position for both turning a work piece and handling it to and from said table.

13. A work handling apparatus comprising an inclinable roller table normally disposed in a horizontal plane, means for moving said table into positions inclined in either longitudinal direction for gravity delivery therealong of a work piece, rotatably mounted work inverting arms carrying rollers and normally forming portions of said table, means for rotating said inverting arms to and from cooperative, off-vertical position for inverting a work piece, a plurality of work turning arms carrying rollers and mounted for rotation about an axis substantially parallel to the axes of rotation of said inverting arms and adjacent an end of said table, said turning arms being normally disposed in substantially horizontal position beneath said table, means for rotating said turning arms to and from raised position for both turning a work piece and handling it to and from said table, work supporting fingers carried by said turning arms and rotatably mounted relative thereto adjacent the axis of rotation of said turning arms, said supporting fingers being normally disposed in work supporting position substantially perpendicular to said turning arms and extending from their work engaging surfaces, and means for rotating said fingers into and out of work supporting position.

14. A work handling apparatus comprising an inclinable roller table normally disposed in a horizontal plane, means for moving said table into positions inclined in either longitudinal direction for gravity delivery therealong of a work piece, rotatably mounted work inverting arms carrying rollers and normally forming portions of said table, means for rotating said inverting arms to and from cooperative, off-vertical position for inverting a work piece, a plurality of work turning arms carrying rollers and mounted for rotation about an axis substantially parallel to the axes of rotation of said inverting arms and adjacent an end of said table, said turning arms being normally disposed in substantially horizontal position beneath said table, means for rotating said turning arms to and from raised position for both turning a work piece and handling it to and from said table, work supporting fingers carried by said turning arms and rotatably mounted relative thereto adjacent the axis of rotation of said turning arms, said supporting fingers being normally disposed in work supporting position substantially perpendicular to said turning arms and extending from their work engaging surfaces, means for rotating said fingers into and out of work supporting position, and an adjustable stop for limiting the upward rotation of said turning arms.

15. A combined work conveyor, inverter, and turner comprising a pair of work inverting arms mounted for rotation about substantially parallel adjacent axes from which they extend in opposite directions, said inverting arms being adapted to be folded upwardly and returned to substantially horizontal position by movement about said adjacent axes for inverting a work piece, means for folding and unfolding said arms, said arms forming a work conveyor when in normal, substantially horizontal position, said conveyor adapted to be inclined for gravity delivery of a work piece therealong, means for moving said conveyor about an axis to incline the same, at least one of said inverting arms being composed of a plurality of laterally spaced sections, a work turning arm mounted for rotation about an axis adjacent one end of said conveyor section, said turning arm being composed of a plurality of laterally spaced sections interleaved with said laterally spaced sections of said inverting arm when in its normal substantially horizontal position, and means for rotating said turning arm about its axis to and from raised position for turning and handling a work piece.

16. A combined work conveyor, inverter, and turner comprising a pair of work inverting arms mounted for rotation about substantially parallel adjacent axes from which they extend in opposite directions, said inverting arms being adapted to be folded upwardly and returned to substantially horizontal position by movement about said adjacent axes for inverting a work piece, means for folding and unfolding said arms, said arms forming a work conveyor when in normal, substantially horizontal position, said conveyor adapted to be inclined for gravity delivery of a work piece therealong, means for moving said conveyor about an axis to incline the same, at least one of said inverting arms being composed of a plurality of laterally spaced sections, a work turning arm mounted for rotation about an axis adjacent one end of said conveyor section, said turning arm being composed of a plurality of laterally spaced sections interleaved with said laterally spaced sections of said inverting arm when in its normal substantially horizontal position, means for rotating said turning arm about its axis to and from a raised position for turning and handling a work piece, work supporting fingers rotatably mounted on each of said sections of said turning arm, and means for rotating said fingers into and out of work supporting position.

MALCOLM H. FREEMAN.

CERTIFICATE OF CORRECTION.

Patent No. 2,235,832. March 25, 1941.

MALCOLM H. FREEMAN.

It is hereby certified that error appears in the printed specification of the above numbered patent requiring correction as follows: Page 3, second column, line 74, for "than" read --that--; page 4, second column, line 71, claim 3, for "and end" read --an end--; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.